July 1, 1958  L. H. LEONARD, JR  2,840,997
ABSORPTION REFRIGERATION SYSTEMS
Filed May 2, 1955  4 Sheets-Sheet 1

INVENTOR.
Louis Howell Leonard, Jr.
BY
Herman Seid
atty.

July 1, 1958  L. H. LEONARD, JR  2,840,997
ABSORPTION REFRIGERATION SYSTEMS
Filed May 2, 1955  4 Sheets-Sheet 2

INVENTOR.
Louis Howell Leonard, Jr.
BY Herman Seid
Atty.

July 1, 1958  L. H. LEONARD, JR  2,840,997
ABSORPTION REFRIGERATION SYSTEMS
Filed May 2, 1955  4 Sheets-Sheet 3

INVENTOR.
Louis Howell Leonard, Jr.
BY Herman Seid
   Atty.

July 1, 1958  L. H. LEONARD, JR  2,840,997
ABSORPTION REFRIGERATION SYSTEMS
Filed May 2, 1955  4 Sheets-Sheet 4

INVENTOR.
Louis Howell Leonard Jr.
BY
Herman Seid
Atty.

United States Patent Office 2,840,997
Patented July 1, 1958

2,840,997

ABSORPTION REFRIGERATION SYSTEMS

Louis Howell Leonard, Jr., East Syracuse, N. Y., assignor to Carrier Corporation, Syracuse, N. Y., a corporation of Delaware Application May 2, 1955, Serial No. 505,369

11 Claims. (Cl. 62—494)

This invention relates to absorption refrigeration systems and, more particularly, to an absorption refrigeration system in which the noise created by operation of the system is greatly reduced and in which the power requirements for circulating solution in the system are reduced over systems of comparable capacity heretofore employed in the industry.

In Berestneff Patent No. 2,565,943 there is disclosed an absorption refrigeration system which has entered into extensive use. This machine includes a pump to supply weak solution from the absorber to the generator and an ejector to supply strong solution from the generator to the absorber. This arrangement frequently is noisy in operation due to flashing of refrigerant in the suction and diffuser of the ejector and in the solution line from the ejector to the absorber; it also requires excessive power in operation since it is necessary to employ a pump of sufficient capacity to actuate the ejector as well as to supply weak solution to the generator. That is the entire amount of solution handled by the pump has to be built up to a pressure sufficiently high to operate the ejector even though approximately forty percent of the flow (flow to the generator) need be built up to a pressure only slightly above atmospheric pressure. The additional head need be dissipated before the solution arrives at the generator which may be done by an orifice plate. In addition, an ejector cannot be designed satisfactorily to compensate for all load conditions; the saturated condition of the solution throughout most of the circuit upon slight disturbance in flow or pressure conditions results in flashing and noise generation. While it is possible to design an ejector which is quiet in operation, it will be appreciated such quiet operation is attained only when the impelling, discharge and suction pressures, the impelling flow, the entrained flow, and all other operating conditions are at precise design conditions. In actual operation, such conditions probably never exist so that it is necessary to employ an over-capacity ejector to meet all conditions likely to be encountered. Such ejectors are inherently noisy in operation. Hence, while a system satisfactory in operation can be constructed, such system necessarily is noisy in operation to an extent frequently found objectionable.

In Reid Patent No. 2,502,104 there is disclosed an absorption refrigeration system for small capacities in which a pump is provided to supply solution to the generator from the absorber, a by-pass line being provided from the outlet of the pump to sprays in the absorber to spray solution of the same concentration as forwarded to the generator in the absorber. This is particularly undesirable in systems of large capacities since it requires continual recirculation of weak solution throughout the absorber. Weak solution, of course, has less absorptive power than strong solution; hence, capacity need be sacrificed to an extent which would not be feasible in systems of large tonnage. During operation, a system of this type tends to operate at increasingly high solution concentrations thus increasing the possibilities of solution solidification or crystallization.

The chief object of the present invention is to provide an absorption refrigeration system in which these disadvantages of prior systems are obviated.

An object of the present invention is to provide an absorption refrigeration system which is relatively quiet, inexpensive in operating costs and comparatively free of operating difficulties in circulating solution.

A further object is to provide a method of operation of an absorption refrigeration system which permits relatively quiet operation to be obtained and is comparatively free of operating difficulties in the circulation of solution. Other objects of the invention will be readily perceived from the following description.

This invention relates to an absorption refrigeration system which comprises, in combination, a generator, a condenser, an absorber and an evaporator, means for supplying weak solution from the absorber to the generator, means for supplying strong solution from the generator to the absorber without admixture with weak solution prior to its discharge in the absorber, and means for recirculating a solution of intermediate concentration in the absorber.

This invention further relates to a method of operation of an absorption refrigeration system including a generator, a condenser, an evaporator and an absorber in which the steps consist in supplying weak solution from the absorber to the generator, supplying strong solution from the generator to the absorber without admixture with weak solution prior to its discharge in the absorber, and recirculating a solution of intermediate concentration in the absorber.

The attached drawings illustrate a preferred embodiment of the present invention, in which—

Figure 1:
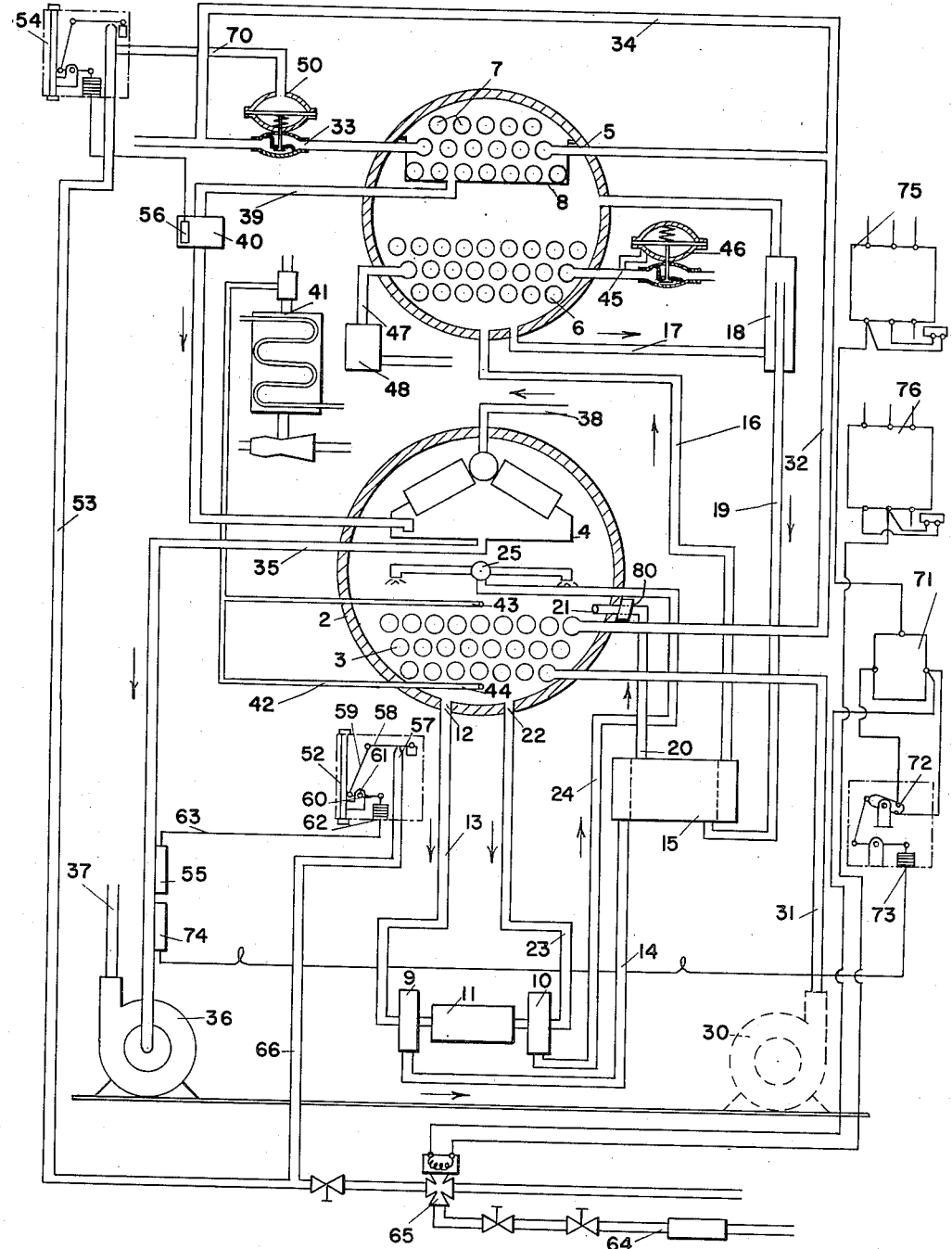
Figure 1 is a diagrammatic view illustrating the absorption refrigeration system of the present invention.

Referring to the attached drawings, there is illustrated diagrammatically in Figure 1 the absorption refrigeration system of the present invention. The system comprises a shell 2 containing a plurality of tubes 3 which cooperate with the shell to form an absorber. Placed in shell 2 above absorber 3 is a pan-like member 4 which cooperates with shell 2 to form an evaporator. A second shell 5, preferably, is placed above the first shell. Tubes 6 extend in the lower portion of shell 5 and cooperate with shell 5 to form a generator. A plurality of tubes 7 are placed in the upper portion of shell 5 to form a condenser. The tubes 7 cooperate with a pan-like member 8 to form a condenser.

A double pump arrangement is provided to circulate solution through the system, as hereinafter described. This arrangement includes pump 9 which serves to supply weak solution from the absorber to the generator and pump 10 which serves as an absorber pump. Pumps 9 and 10 are driven by a motor 11; if desired, of course, separate motors may be provided.

Figure 3:
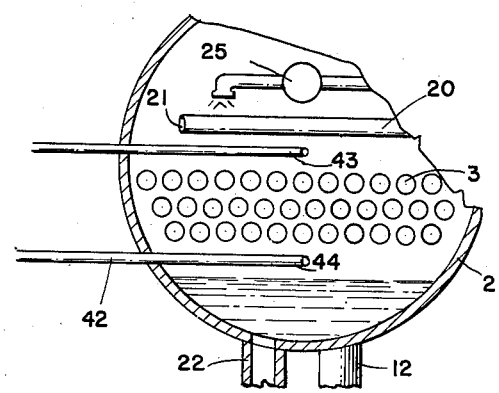
Figure 3 is a fragmentary sectional view taken laterally through the absorber shell.

Pump 9 withdraws weak solution from absorber 3 through outlet 12 and line 13. Pump 9 forwards the weak solution through line 14, heat exchanger 15 and line 16 to generator 6. Strong solution is withdrawn from generator 6 through line 17 to an overflow arrangement 18 which maintains a desired level of solution in generator 6, and is returned to the absorber through line 19, heat exchanger 15, line 20 and inlet 21 of the absorber by forces of gravity. As hereinafter described, the strong solution may be dumped in the absorber over the tubes 3 as shown in Figure 3 or if desired may be discharged against an interior wall of shell 2.

Pump 10 is the absorber pump and is employed to withdraw a solution of intermediate concentration from absorber 3 through outlet 22 and line 23, forwarding the recirculated solution through line 24 to the spray arrangement 25 of the absorber. Sprays 25 serve to distribute the recirculated solution over the tubes throughout the length of the absorber 3. It will be understood the strong solution mixes to some extent with solution in the absorber and that further mixing occurs as pump 10 forwards the mixed solution so that a solution having a concentration intermediate the concentration of the strong and weak solutions is circulated. It is important that the strong solution be discharged in the absorber at a place where interference with the purging operation cannot occur. The strong solution is superheated with regard to pressure existing in the absorber so that it flash cools upon discharge in the absorber liberating a considerable amount of water vapor. It is important that this vapor be liberated in a manner that does not interfere with the collection of non-condensibles at a specific location beneath the tubes. Flash cooling of the strong solution upon discharge in the absorber is desirable; this procedure, of course, could not be followed by the use of an external heat exchanger because of the danger of possible solidification and additional pressure drop imposed on the solution circuit. Gravity return plus the small difference in pressure is all that is available to return the strong solution from the generator to the absorber.

Pump 30 supplies condensing water through line 31 to the tubes 3 of the absorber. The condensing water, after passage through tubes 3, passes through line 32 to the tubes 7 of the condenser. The condensing water, after passage through the tubes of the condenser, is discharged to a cooling tower or drain through line 33. Preferably, a by-pass line 34 is provided about the tubes 7 of the condenser extending from line 32 to line 33.

Chilled water is withdrawn from the evaporator 4 through line 35 by pump 36 and is circulated to a place of use which may be the central station of an air conditioning system through line 37. The chilled water is returned to the evaporator through line 38 and is flash cooled in the evaporator, the flashed vapor passing to the absorber.

Condensate leaves condenser 7 through line 39 and is returned to the evaporator being flash cooled in the evaporator, the flashed vapor passing to the absorber 3, as previously described. A bottle 40 or similar container is placed in line 39, for a purpose hereinafter described.

A suitable purge arrangement 41 is provided to remove non-condensible gases from the absorber. Purge arrangement 41 is connected to the absorber by line 42 which is attached to purge lines 43 and 44 extending longitudinally of the absorber. Line 43 being placed above the tubes while line 44 is placed immediately below the tube bundle at the center of the bundle.

Steam is supplied to the tubes 6 of the generator through line 45. The usual pressure regulating valve 46 may be placed in line 45 to assure desired steam pressure in the generator. Valve 46 assures that the pressure of steam passing to the generator is controlled at a predetermined point. If desired a steam boiler control may be employed.

Steam condensate leaves the tubes of generator 6 through line 47, a steam trap 48 being provided in line 47 to assure that only condensate leaves the generator.

A normally closed pneumatic valve 50 is placed in line 33 (Figure 1) between the tubes 7 of the condenser and the connection of by-pass line 34 with line 33; valve 50 regulates passage of condensing water through the tubes of condenser 7. Valve 50 is actuated as hereinafter described. The by-pass 34 assures that the flow of condensing water is maintained substantially constant while permitting variation in flow of condensing water through the tubes of condenser 7.

A thermostatic control 52 regulates the pressure of air passing through branch line 53 to a second thermostatic control 54. Thermostatic control 54 in turn regulates the air pressure applied to valve 50. Thermostatic control 52 is actuated by means of a bulb 55 placed adjacent chilled water line 35. Bulb 55 reflects the temperature of chilled water which in turn indicates the load imposed upon the system. Control 54 is actuated by bulb 56 which reflects saturation temperature corresponding to pressure in shell 5. As stated above, preferably, bulb 56 is placed in a container 40 in line 39.

Thermostats 52 and 54 are similar in design. Each includes a vent 57 adapted to be closed by flapper 58 which is supported by a lever 59 connected to an arm 60 pivoted at 61. Referring to thermostat 52, the opposite end of arm 60 is connected to a bellows 62 which forms a part of the thermal responsive system including bulb 55 being connected to bulb 55 by capillary 63.

Pressure is supplied to the controls through main air line 64. Preferably, a solenoid valve 65 or relay of suitable design is placed therein as a safety control, as hereinafter described. Air pressure passes from line 64 to line 53. Thermostat 52 is connected to line 53 by branch line 66; thus, pressure in branch line 53 may be regulated by thermostat 52 venting a portion of air therein to the atmosphere in accordance with the temperature of chilled water, reflecting the load imposed upon the system.

Thermostat 54 has air pressure applied therein through line 53 and vents air to the atmosphere through vent 57 as determined by saturation temperature corresponding to pressure in shell 5. Branch line 53 is also connected to valve 50 by line 70. Thermostats 52 and 54 regulate the air pressure applied to the diaphragm of valve 50.

A rotary switch 71 is provided which is connected to a mercury switch 72. Mercury switch 72 may be actuated by means of a bellows 73 and bulb 74 placed adjacent chilled water line 35. Mercury switch 72 serves in effect as a safety control. An increase in temperature of chilled water above a predetermined point opens this switch thereby closing solenoid valve 65 to prevent supply of air to controls 52, 54 and valve 50. The starters 75 and 76 actuate the motor 11 of pumps 9, 10 and the motor (not shown) of chilled water pump 36. A starter for the condensing water pump 30 is not shown since such pump and motor are generally provided by the installer.

The control arrangement herein shown is described and claimed in my co-pending application Serial No. 240,645, filed August 7, 1951, now patent No. 2,722,805, entitled "Control Arrangement for Absorption Refrigeration System," and reference is made to such application for a full description of the control arrangement and the manner in which it operates.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water.

With such solution the maximum allowable solution concentration leaving the generator is 66%. A greater concentration may permit crystallization to occur causing solidification in the heat exchanger and perhaps in other portions of the system.

Figure 2:
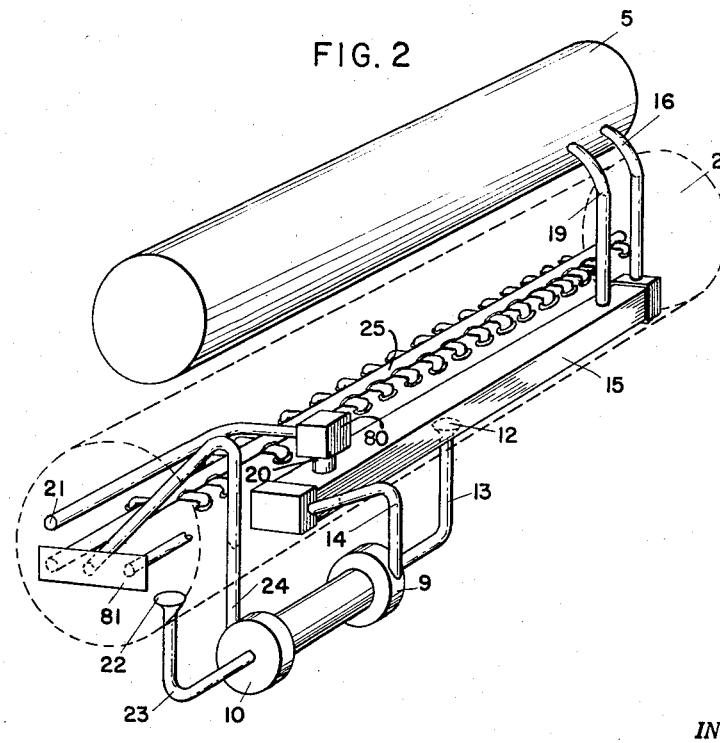
Figure 2 is a diagrammatic view illustrating the manner in which solution is distributed in the absorber.
Figure 5:
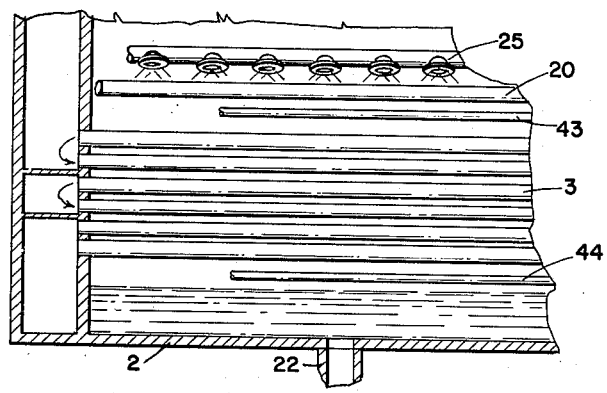
Figure 5 is a fragmentary sectional view taken longitudinally of the absorber shell illustrating the discharge of strong solution against the inner wall of the shell.

In Figure 2 I have shown more clearly the manner in which the various solutions flow to and from the generator and are distributed within the absorber. Strong solution passes from the generator 6 through line 19 to heat exchanger 15 where it is placed in heat exchange relation with weak solution being supplied to the generator. After passage through heat exchanger 15 the strong solution passes through line 20 and valve 80 which is placed on the side of shell 2 to the discharge inlet 21 within the shell 2 which discharges strong solution over the tubes of the absorber. The strong solution is flash cooled to some extent upon discharge in the absorber. The strong solution is discharged at a point above the tubes to prevent interference with the purging operation. It will be appreciated if desired the strong solution may be discharged against an interior wall of the shell as shown in Figure 5. Weak solution is withdrawn from outlet 12 through line 13 by pump 9 and is passed through line 14 to heat exchanger 15 and then through line 16 to the generator in shell 5. Pump 10 withdraws solution of intermediate concentration through outlet 22 and line 23 returning the solution of intermediate concentration through line 24 to a header 81 which distributes the solution of intermediate concentration to the spray arrangement 25 which sprays the solution of intermediate concentration over the tubes of the absorber throughout the length and width of the absorber.

For quiet operation, it is essential that both pumps 9, 10 possess adequate suction level, that is, the suction of both pumps be flooded at all times. Since the strong solution is returned to the absorber by forces of gravity, solution in the absorber seeks its own level. Pumps 9, 10 can never run dry so long as solution is present in the absorber even though the flow through each pump may vary considerably from design conditions, due to manufacturing irregularities, clogged solution spray nozzles, clogged solution heat exchangers, etc., so that the noise level is extremely low.

Figure 4:
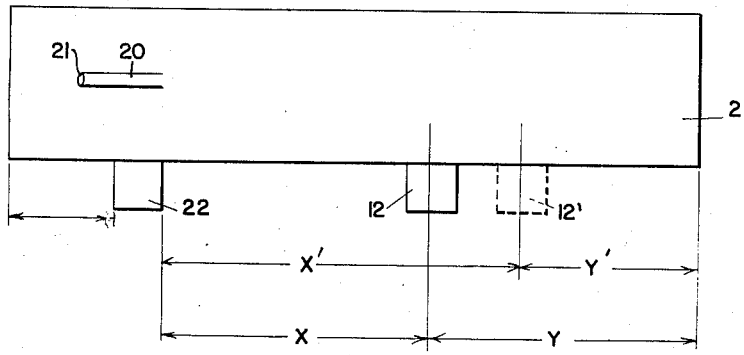
Figure 4 is a diagrammatic view illustrating the position of the outlets in the absorber shell.

The relative arrangement of the outlets 12 and 22 is of particular importance in the present invention. The outlets 12 and 22 are arranged in the absorber in accordance with the volume of solution to be supplied to the generator and the volume of solution to be recirculated. It will be observed, referring to Figure 4, that strong solution is discharged over the tubes of the absorber at any place between the end of the shell and outlet 22, the position of outlet 22 being predetermined in accordance with the design volume of recirculated solution; assuming the volume of weak solution flowing to the generator equals one half of the total volume of solution recirculated by pump 10, outlet 12 is positioned a predetermined distance from the opposite end of the shell. If it be assumed that the distance from outlet 22 to the center line of outlet 12 is $x$ then the distance from the center line of outlet 12 to the opposite end of the shell marked $y$ is equal to $x$. Assuming that flow to the generator is about one third of the total volume of solution being recirculated by pump 10, then the position of outlet 12 must be changed as indicated at 12' and in such case the distance $y'$ would be approximately equivalent to $\frac{2}{3}x'$; that is outlet 12' would be placed from the opposite end of the shell a distance about two thirds of $x'$.

Under this arrangement of the outlets 12, 22, it will be observed that the strong solution is discharged in the absorber in a position where it can leave only through outlet 22 mixing with solution in the absorber. Since solution supplied to the absorber seeks its own level, flow of strong solution in the absorber must be toward outlet 22, a sufficient volume of solution in the absorber also flowing toward outlet 22 to form a solution of intermediate concentration making up the required volume to satisfy the requirements of pump 10. It would be impossible for strong solution to flow past outlet 22 to leave the absorber through outlet 12 since the direction of solution flow between outlets 12 and 22 is contrary. Thus, only weak solution can be withdrawn from the absorber through outlet 12.

Considering the operation of the system at full load (100% capacity) it will be appreciated that the pressure of steam supplied to the generator is fixed by pressure reducing valve 36. Since the pressure is fixed the temperature is likewise fixed. At full load the temperature of solution leaving the generator is fixed. At full load the temperature differential between the temperature of solution leaving the generator and the condensing temperature employing a solution of lithium bromide in water as the absorber and water as the refrigerant in a 66% concentration is 105° F. If the temperature of condensing water is low a differential of less than 105° F. is satisfactory if it produces the necessary capacity because the absorber may operate at a much lower solution concentration if the temperature of the condensing water is low. That is, the same mean effective temperature difference required to transfer the same amount of heat may be obtained with much lower solution concentrations.

Low entering condensing water temperatures will permit the machine to operate at lower solution concentrations for the same leaving chilled water temperatures. In other words, the machine takes advantage of working at lowest possible solution concentrations to prevent accidential solidification. The control arrangement is designed to maintain the temperature differential between condensing temperature and temperature of solution leaving the generator at a temperature not greater than 105° F. which assures efficient operation of the system and eliminates any possibility of crystallization of solution in the heat exchanger or other parts of the system.

Compressed air pressure is applied to thermostats 52 and 54 through main air line 64 and branch lines 53 and 66. Thermostat 52 serves to vary the pressure in line 53 in accordance with variations in temperature of chilled water leaving the evaporator which reflects the load imposed upon the system. Thermostat 54 in response to variation in saturation temperature corresponding to pressure in shell 5 as reflected by bulb 56 varies the air pressure imposed upon valve 50 which regulates passage of condensing water through the tubes of condenser 7.

At full load both controls 52 and 54 are effective to regulate valve 50. Valve 50 is regulated to maintain the temperature differential at 105° F. or less depending upon the entering and condensing water temperatures, chilled water temperature desired, etc. Slight changes in chilled water temperature and saturation temperature corresponding to pressure in shell 5 are reflected by bulbs 55, 56 so that the controls function to move valve 50 toward open or closed positon to maintain the required differential.

At start-up, pumps 9 and 10 are actuated, pump 9 withdrawing weak solution from absorber 3 through outlet 12 and line 13, forwarding the weak solution through line 14, heat exchanger 15 and line 16 to the generator. Refrigerant vapor is boiled from the solution in generator 6, strong solution leaving the generator through line 17, overflow 18, line 19, heat exchanger 15, line 20 and is discharged over an end of the absorber tube bundle from inlet 21. The strong solution is flash cooled to some extent as it is discharged in the absorber. The discharged strong solution mixes with solution in the absorber and is withdrawn from the absorber through outlet 22 and line 23 by pump 10, the solution of intermediae concentration so formed being returned to the absorber through line 24 and being sprayed over the tube bundle by spray arrangement 25. It will be appreciated that the mixture of strong solution and solution in the absorber forming the solution of intermediae concentration is further mixed and cooled during its passage through the recirculation system.

The arrangement assures that only weak solution is forwarded to the generator by pump 9 as explained above. Solution level in the absorber is maintained by means of gravity, thus eliminating any problem involved in the maintenance of sufficient head on the pumps to prevent pumps running dry and permitting the system to be operated without flashing of absorbent throughout the solution lines thus eliminating noise created by flashing.

Considering operation of the system at partial load, temperature of chilled water leaving the evaporator reduces below the control point of thermostat 54 and causes a proportionate decrease is pressure in branch line 53 since thermostat 52 is moved to an air venting position. Under normal conditions at partial load thermostat 54 is ineffective and valve 50 may be deemed to be regulated directly by thermostat 52.

As temperature of chilled water decreases, thermostat 52 regulates valve 50 to decrease the volume of condensing water passing through the tubes of condenser 7. Since the volume of condensing water passing through the tubes of condenser 7 is decreased the condenser is able to do less work, thus the condensing temperature increases. The increase in condensing temperature causes a proportionate increase in pressure in shell 5. A decrease in the work performed by the generator is caused by the decrease in the ability of the condenser to perform work so that the specific load upon the generator is reduced resulting in the overall heat transfer being proportionately reduced with less refrigerant being boiled off. Since less refrigerant is removed from the solution in the generator the concentration of solution leaving the generator is reduced.

At partial load as the condensing temperature increases, concentration of solution leaving the generator decreases and the temperature difference between the condensing temperature and the solution temperature leaving the generator also decreases. Since the condenser is able to do less work the temperature differential between solution leaving the generator and the condenser temperature is less than 105° F. If, for example, an unexpected increase in steam pressure or drop in entering water temperature occurs, this temperature differential will increase to a point where thermostat 54 becomes effective automatically to throttle valve 50 to reduce still more the amount of condensing water passing through condenser 7.

Figure 6:
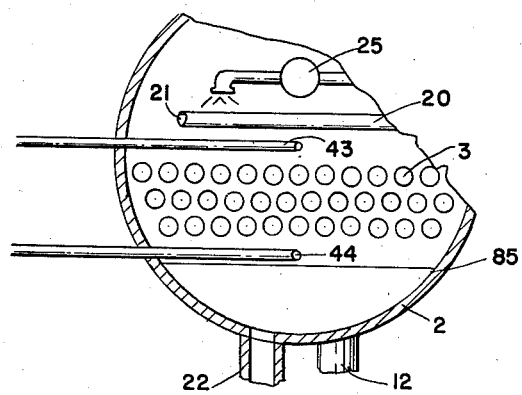
Figure 6 is a fragmentary sectional view taken laterally of the absorber shell illustrating a barrier across the shell below the tube bundle to separate the outlets.

It will be appreciated when the strong solution is discharged within the absorber, the strong solution flash cools itself down to the saturation temperature corresponding to the pressure in the absorber shell which improves the efficiency of the system. Any strong solution returning from the generator is prevented from being returned to the generator by the location of the absorber outlets. If desired for further security in preventing return of strong solution to the generator a small baffle or barrier 85 may be placed across the shell below the tube bundle and between the outlets as shown in Figure 6, thus positively preventing strong solution flowing to outlet 12.

Figure 7:
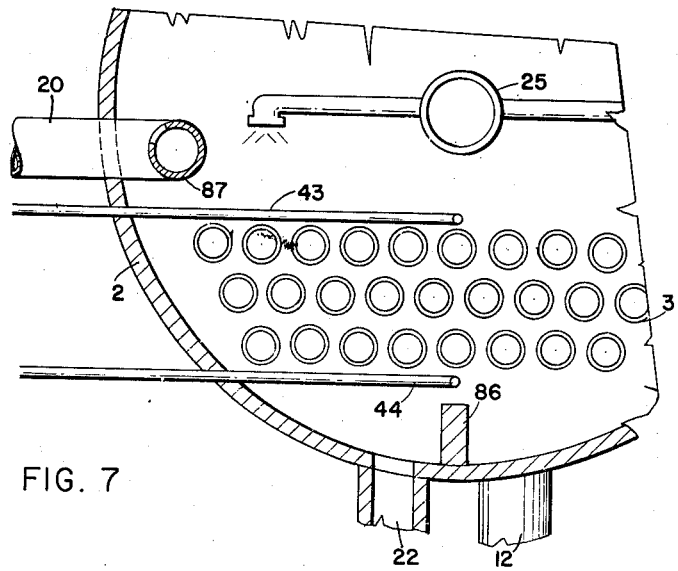
Figure 7 is a fragmentary sectional view taken laterally of the absorber shell illustrating a modification of the invention.

In Figure 7 there is shown a modification of the invention in which the strong solution is discharged against the interior wall of the shell 2 longitudinally of the shell. A weir or barrier 86 extends longitudinally of shell 2 separating the base of the shell into two sumps. Header 87 serves to discharge strong solution from the generator against the interior wall of the shell longitudinally thereof. In other respects, the structure is the same as previously described.

Figure 8:
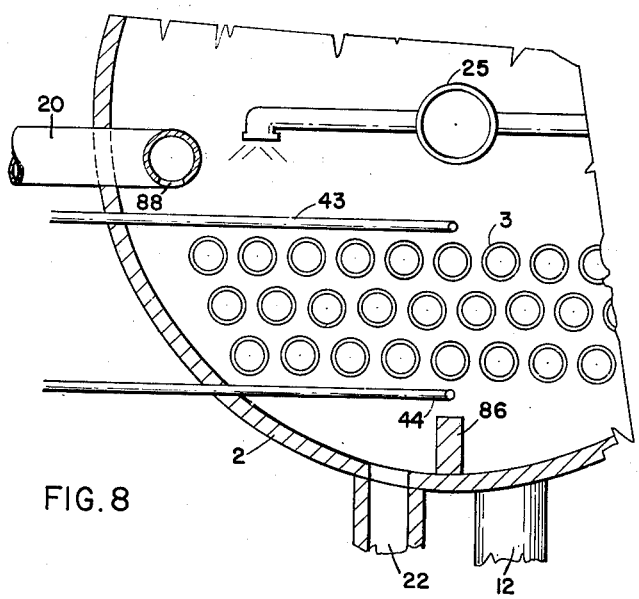
Figure 8 is a fragmentary sectional view taken laterally of the absorber shell illustrating a modified form of the invention shown in Figure 7.

In Figure 8, there is shown a modified form of the structure shown in Figure 7. In this case, headed 88 discharges strong solution from the generator over the tubes of the absorber.

The present invention provides an absorption refrigeration system which is economical in cost as compared to systems of this type heretofore known and in which the noise problem due to flashing of refrigerant in solution lines has been eliminated or decreased to a minimum. The system provides improvement in overall performance due to the elimination of superheat in the strong solution returning to the absorber.

In the absorption refrigeration system of the present invention horsepower requirements for solution circulation have been reduced by as much as 70%. Increased flexibility of operation is provided since the pump circuits are not highly susceptible to irregularities in solution flow. Pump motor speeds have been reduced which results in quieter operation of the solution pumps and motor. Since the pumps are operated at low speeds, longer seal life results. Since the solution flow is not critical, partially clogged spray nozzles may result in a loss of capacity but do not render the system inoperative.

In the present system, the employment of pumps to circulate the solutions and the elimination of a solution ejector permit solution velocities to be increased for the liquid is circulated by means of a pump instead of an ejector. Increased solution velocities result in considerably smaller solution pipe sizes, resulting in a considerable reduction in the overall solution charge required. This is extremely important because the solution employed in the machine is expensive.

While I have described a preferred embodiment of the invention, it will be understood that the invention is not limited thereto since it may be otherwise embodied within the scope of the following claims.

I claim:

1. In an absorption refrigeration system, the combination of a generator, a condenser, a shell containing an absorber and an evaporator, said absorber including a sump, a first outlet in said sump through which solution of intermediate concentration may be withdrawn and a second outlet in said sump through which weak solution may be withdrawn, means for withdrawing weak solution through the second outlet and for supplying the withdrawn weak solution to the generator, means for supplying strong solution from the generator to the absorber without admixture with weak solution prior to its discharge in the absorber, and means for withdrawing the solution of intermediate concentration through the first outlet and for discharging the withdrawn solution of intermediate concentration in the absorber.

2. In an absorption refrigeration system, the combination of a generator, a condenser, a shell containing an absorber and an evaporator, the absorber being placed in the shell below the evaporator to permit vapor to flow downward to be absorbed by solution in the absorber, the absorber including a plurality of tubes through which cooling medium is passed in heat exchange relation with solution and vapor exteriorly of the tubes, a sump below said tubes having a first outlet through which solution of intermediate concentration is withdrawn and a second outlet through which weak solution is withdrawn, a pump to withdraw weak solution from the absorber through the second outlet of the sump and to supply the withdrawn weak solution to the generator, means for supplying strong solution from the generator to the absorber without admixture with weak solution prior to its discharge in the absorber, and means for withdrawing the solution of intermediate concentration from the absorber through the first outlet of the sump and for discharging the withdrawn solution of intermediate concentration in the absorber.

3. An absorption refrigeration system according to claim 2 in which the means for supplying strong solution to the absorber are placed to discharge strong solution over the tubes adjacent one end of the shell and adjacent the first outlet in the absorber sump for the solution of intermediate concentration.

4. An absorption refrigeration system according to claim 2 in which the means for supplying strong solution to the absorber are placed to discharge strong solution against the interior wall of the shell adjacent the first outlet for solution of intermediate concentration.

5. An absorption refrigeration system according to claim 2 including a barrier extending longitudinally of the shell adjacent the bottom thereof forming two sump sections in the bottom of the shell and in which the means for supplying strong solution to the absorber are placed to discharge the strong solution longitudinally of the shell over a number of the tubes and into the sump section supplying the first outlet for solution of intermediate concentration.

6. An absorption refrigeration system according to claim 2 including a barrier extending longitudinally of the shell adjacent the bottom thereof forming two sump sections in the bottom of the shell, and means for discharging strong solution against the interior wall of the shell longitudinally thereof adjacent the sump section for supplying the first outlet for solution of intermediate concentration.

7. In an absorption refrigeration system, the combination of a generator, a condenser, an evaporator and an absorber, vapor from the evaporator flowing to the absorber to be absorbed by solution therein, the absorber including a plurality of tubes through which cooling medium is passed in heat exchange relation with solution and vapor exteriorly of the tubes, and a sump placed below the tubes, said absorber sump having a first outlet therein, means connecting the outlet with the generator, said connecting means including a pump to withdraw weak solution from the sump through the outlet and to forward the weak solution to the generator, pipe members through which strong solution is supplied from the generator to the absorber by forces of gravity without admixture with weak solution prior to its discharge in the absorber, said absorber sump having a second outlet therein, means connected to the second outlet for withdrawing a solution of intermediate concentration from the absorber sump through the second outlet and for returning said solution to the absorber, spray nozzles connected to the withdrawal means for distributing the solution of intermediate concentration over the tubes of the absorber, said outlets being so disposed with relation to each other that weak solution only passes through the first outlet, and means in the absorber placed above the tubes and connected to the pipe members for discharging strong solution over the tubes adjacent one end of the absorber and the second outlet thereby flash cooling the discharged strong solution.

8. In an absorption refrigeration system the combination of a generator, a condenser, a shell containing an absorber and an evaporator, vapor from the evaporator flowing to the absorber to be absorbed by solution therein, the absorber including a plurality of tubes to which cooling medium is passed in heat exchange relation with solution and vapor exteriorly of the tubes, said absorber having a first outlet therein, means connecting the outlet with the generator, said connecting means including a pump to withdraw weak solution from the outlet and to forward the weak solution to the generator, pipe members through which strong solution is supplied from the generator to the absorber by forces of gravity without admixture with weak solution prior to its discharge in the absorber, said absorber having a second outlet therein, means connected to the second outlet for withdrawing a solution of intermediate concentration from the absorber and for returning said solution to the absorber, spray nozzles connected to the withdrawal means for distributing the solution of intermediate concentration over the tubes of the absorber, said outlets being so placed with relation to each other that weak solution only passes through the first outlet, and means in the absorber placed above the tubes connected to the pipe members for discharging strong solution against the interior wall of the end of the shell adjacent the second outlet thereby flash cooling the discharged strong solution.

9. In an absorption refrigeration system, the combination of a generator, a condenser, a shell containing an absorber and an evaporator, vapor from the evaporator flowing to the absorber to be absorbed by solution therein, the absorber including a plurality of tubes through which cooling medium is passed in heat exchange relation with solution and vapor exteriorly of the tubes, said absorber having a first outlet therein, means connecting the outlet with the generator, said connecting means including a pump to withdraw weak solution from the outlet and to forward the weak solution to the generator, pipe members through which strong solution is supplied from the generator to the absorber by forces of gravity without admixture with weak solution prior to its discharge in the absorber, said absorber having a second outlet therein, means connected to the second outlet for withdrawing a solution of intermediate concentration from the absorber and for returning said solution to the absorber, spray nozzles connected to the withdrawal means for distributing the solution of intermediate concentration over the tubes of the evaporator, said outlets being so placed with relation to each other that weak solution only passes through the first outlet, a barrier extending longitudinally of the shell adjacent the bottom forming two sump sections in the bottom and means in the absorber placed above the tube bundle and connected to the pipe members for discharging strong solution over the tubes adjacent one sump section and the second outlet thereby flash cooling the discharged strong solution.

10. In an absorption refrigeration system, the combination of a generator, a condenser, a shell containing an evaporator and an absorber, vapor from the evaporator flowing to the absorber to be absorbed by solution therein, the absorber including a plurality of tubes through which cooling medium is passed in heat exchange relation with solution and vapor exteriorly of the tubes, said absorber having a first outlet therein, means connecting the outlet with the generator, said connecting means including a pump to withdraw weak solution from the outlet and to forward the weak solution to the generator, pipe members through which strong solution is supplied from the generator to the absorber by forces of gravity without admixture with weak solution prior to its discharge in the absorber, said absorber having a second outlet therein, means connected to the second outlet for withdrawing solution of intermediate concentration from the absorber and for returning said solution to the absorber, spray nozzles connected to the withdrawal means for distributing the solution of intermediate concentration over the tubes of the absorber, said outlets being so placed with relation to each other that weak solution only passes through the first outlet, a barrier extending longitudinally of the shell serving to form two sump sections in the base thereof, and means in the absorber placed above the tubes and connected to the pipe members for discharging strong solution against the longitudinally extending wall of the shell adjacent the second outlet thereby flash cooling the discharged strong solution.

11. In an absorption refrigeration system, the combination of a generator, a condenser, a shell containing an absorber and an evaporator, vapor from the evaporator flowing to the absorber to be absorbed by solution therein, the absorber including a plurality of tubes through which a cooling medium is passed in heat exchange relation with solution and vapor exteriorly of the tubes, said absorber having a first outlet therein, means connecting the outlet with the generator, said connecting means including a pump to withdraw weak solution from the outlet and to forward the weak solution to the generator, pipe members through which strong solution is supplied from the generator to the absorber by forces of gravity without admixture with weak solution prior to its discharge in the absorber, said absorber having a second outlet therein, means connected to the second outlet for withdrawing a solution of intermediate concentration from the absorber and for returning said solution of intermediate concentration to the absorber, spray nozzles connected to the withdrawal means for distributing the solution of intermediate concentration over the tubes of the absorber, said outlets being so disposed with relation to each other weak solution only passes through the first outlet, means in the absorber placed above the tube bundle and connected to the pipe members for discharging strong solution over the tubes adjacent one end of the absorber and the second outlet thereby flash cooling the discharged strong solution, and a laterally extending barrier placed between the two outlets.

References Cited in the file of this patent

UNITED STATES PATENTS

| | | |
|---|---|---|
| 379,264 | Andrew | Mar. 13, 1888 |
| 1,085,624 | McKee | Feb. 3, 1914 |
| 2,470,756 | Berestneff | May 24, 1949 |
| 2,494,972 | Thomas | Jan. 17, 1950 |
| 2,630,689 | Hellstrom | Mar. 10, 1953 |
| 2,679,733 | Ashley | June 1, 1954 |